United States Patent
Stammers

(10) Patent No.: US 7,324,551 B1
(45) Date of Patent: Jan. 29, 2008

(54) SYSTEM AND METHOD FOR MANAGING BANDWIDTH IN A NETWORK ENVIRONMENT

(75) Inventor: Timothy P. Stammers, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 1093 days.

(21) Appl. No.: 10/316,726

(22) Filed: Dec. 11, 2002

(51) Int. Cl.
*H04L 12/56* (2006.01)

(52) U.S. Cl. ............... 370/468; 370/230; 370/401; 709/226

(58) Field of Classification Search ........... 370/395.21, 370/338, 352–356, 400, 401, 231, 229, 467, 370/230, 468; 709/228, 229, 223–227; 703/21
See application file for complete search history.

(56) References Cited

U.S. PATENT DOCUMENTS

| 6,157,648 | A | 12/2000 | Voit et al. ............... 370/401 |
| 6,366,577 | B1 | 4/2002 | Donovan ............... 370/352 |
| 6,449,588 | B1 | 9/2002 | Bowman-Amuah ....... 703/21 |
| 6,452,915 | B1 | 9/2002 | Jorgensen .............. 370/338 |
| 6,483,835 | B1 | 11/2002 | Tanigawa et al. ..... 370/395.21 |
| 2005/0027870 | A1* | 2/2005 | Trebes, Jr. ............. 709/227 |
| 2007/0133403 | A1* | 6/2007 | Hepworth et al. ....... 370/229 |

* cited by examiner

*Primary Examiner*—John Pezzlo
(74) *Attorney, Agent, or Firm*—Baker Botts L.L.P.

(57) ABSTRACT

A method for managing bandwidth in a network environment is provided that includes monitoring a state transition of a communication session associated with an end user and initiating one or more resource reservation protocol (RSVP) actions based on the state transition. The method also includes controlling a bandwidth allocation associated with the end user based on one or more of the RSVP actions.

18 Claims, 1 Drawing Sheet

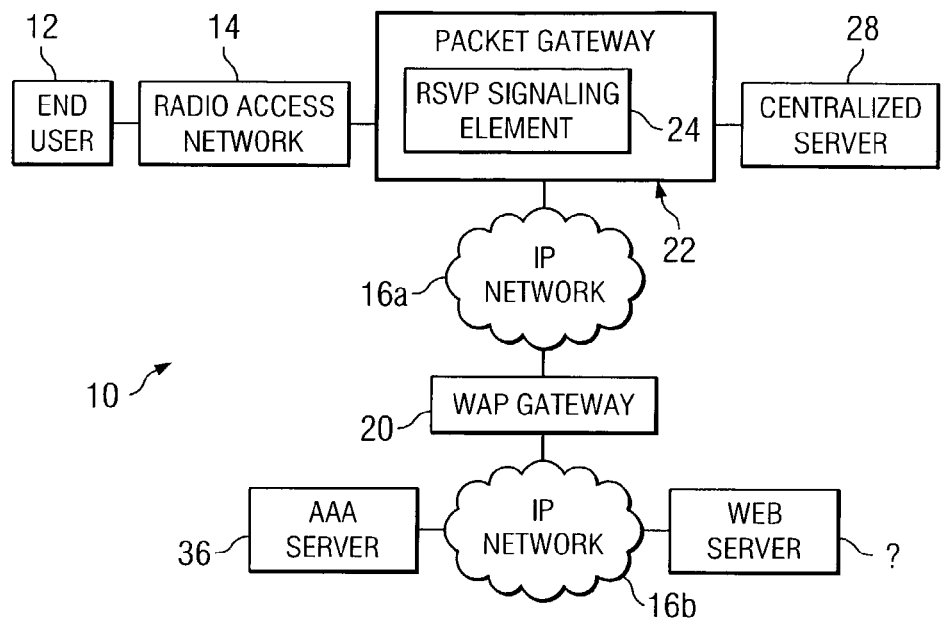
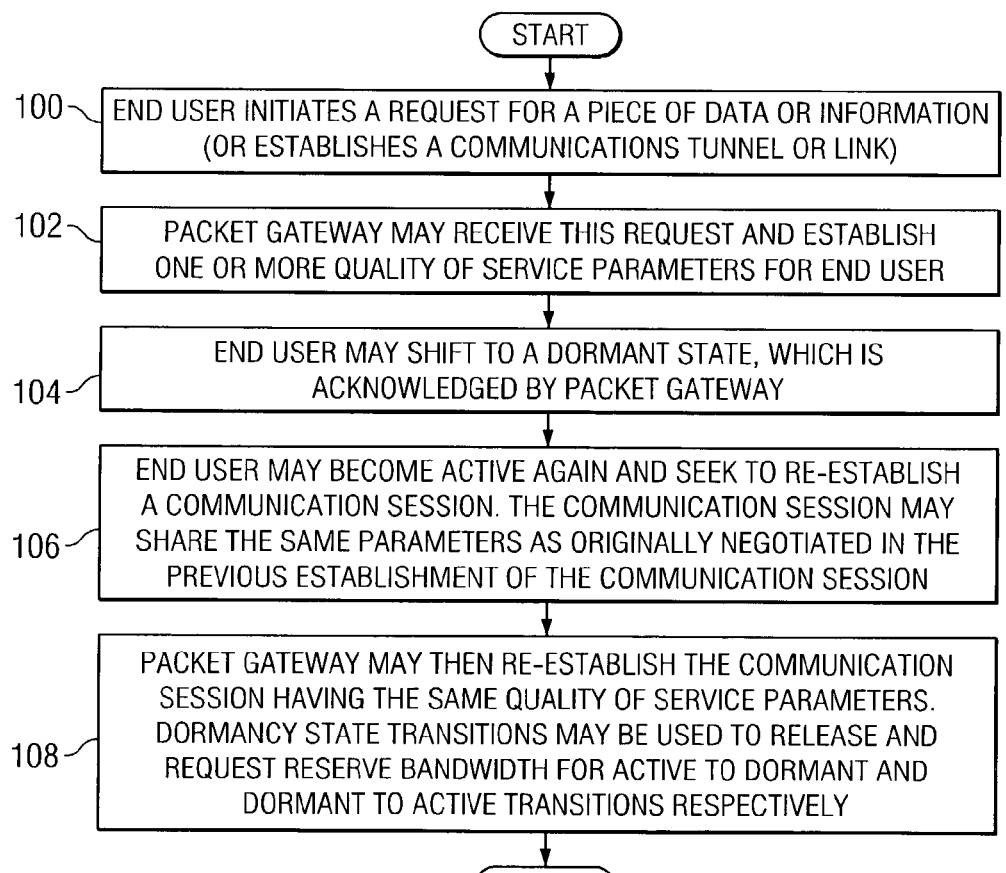

SYSTEM AND METHOD FOR MANAGING BANDWIDTH IN A NETWORK ENVIRONMENT

TECHNICAL FIELD OF THE INVENTION

This invention relates in general to the field of network communications and more particularly to a system and method for managing bandwidth in a network environment.

BACKGROUND OF THE INVENTION

The field of communications has become increasingly important in today's society. One area of importance associated with network communications relates to bandwidth. Various protocols may be used in order to properly dismiss or otherwise remove communications links and tunnels that occupy valuable bandwidth in a network architecture. Additionally, various operations may be performed in order to reserve or otherwise request bandwidth for communications links and tunnels. The proliferation of network devices and components, such as wireless communications elements for example, have made network resources more scarce and increased the importance of having appropriate bandwidth management protocols.

Management protocols should generally be capable of accommodating significant amounts of traffic for devices and components in communication systems and architectures. In executing bandwidth management, it is important to minimize bottlenecks, impedances, and other points of congestion caused by increased communications and responses that are propagating via suitable communication links. Excessive traffic between a terminal and a network gateway may overburden components and elements in a network architecture and deteriorate system performance because of the resources utilized to effectuate these communications. Thus, the ability to provide for effective bandwidth management without inhibiting system speed or hindering system performance presents a significant challenge to network designers and communication system operators.

SUMMARY OF THE INVENTION

From the foregoing, it may be appreciated by those skilled in the art that a need has arisen for an improved bandwidth management approach that offers proper bandwidth allocation for devices or components in a network environment. In accordance with one embodiment of the present invention, a system and method for managing bandwidth are provided that substantially eliminate or greatly reduce disadvantages and problems associated with conventional bandwidth management techniques.

According to one embodiment of the present invention, there is provided a method for managing bandwidth that includes monitoring a state transition of a communication session associated with an end user and initiating one or more resource reservation protocol (RSVP) actions based on the state transition. The method also includes controlling a bandwidth allocation associated with the end user based on one or more of the RSVP actions.

Certain embodiments of the present invention may provide a number of technical advantages. For example, according to one embodiment of the present invention a bandwidth management approach is provided that allows a device or a component within a network environment to receive a proper bandwidth allocation without having to communicate with a packet gateway. This allows a terminal device, such as a mobile station for example, to benefit from RSVP operations without having to interact with the packet gateway. The avoidance of interaction with the packet gateway preserves network resources and further allows a terminal device to avoid maintaining a specific signaling protocol in order to re-establish appropriate communications with a given packet gateway.

Another technical advantage associated with one embodiment of the present invention is a result of the knowledge held by the packet gateway that is associated with dormancy state transitions of terminal devices or elements. This knowledge allows the packet gateway to autonomously re-establish designated operations with a terminal device or element without necessitating communication between the terminal device and the packet gateway. This further simplifies management operations of bandwidth in a network environment. This may also allow a service provider to store end user profiles on centralized servers that offer one or more parameters to be used by a service provider in order to provide a given quality of service. Thus, service providers may control communication sessions that affect an end user without requiring direct communications with the end user. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1 is a simplified block diagram of a system for managing bandwidth in a network environment; and FIG. 2 is a flowchart illustrating a series of example steps associated with a method for managing bandwidth in a network environment.

DETAILED DESCRIPTION OF THE INVENTION

FIG. 1 is a simplified block diagram of a communication system 10 for managing bandwidth in a network environment in accordance with one embodiment of the present invention. Communication system 10 includes an end user 12, a radio access network (RAN) 14, multiple internet protocol (IP) networks 16a and 16b, a wireless application protocol (WAP) gateway 20, and a packet gateway 22 that includes a resource reservation protocol (RSVP) signaling element 24. Communication system 10 may also include a centralized server 28, an authentication, authorization, and accounting (AAA) server 36 and a web server 40. Communication system 10 may be positioned in any suitable network environment or communications architecture such as, for example, a 2.5G or 3G configuration.

According to the teachings of one embodiment of the present invention, packet gateway 22 operates to trigger RSVP actions without the need for end user 12 (or any terminal device or element being used by end user 12) and packet gateway 22 to exchange RSVP signaling traffic across a corresponding communications link. In general, dormancy state transitions may be used to release and to request bandwidth for active to dormant and dormant to active transitions respectively. A given dormancy state transition may be known to packet gateway 22. Terminal dormancy may be generally used as a basis for releasing air link resources when they are no longer needed.

A terminal transitioning from a dormant state back to an active state may require new bandwidth reservations for services requiring a designated amount of bandwidth (or guaranteed bandwidth). The reservations may spawn additional signaling that impacts available bandwidth. The excess signaling may be obviated by packet gateway 22 as it provides a linkage of dormant/active state transitions. The linkage may be utilized in order to autonomously release or to request bandwidth in a network environment. Packet gateway 22 may readily recognize a state transition associated with a given communication session of end user 12. Packet gateway 22 may then release or request bandwidth based on this information without requiring end user 12 to communicate with packet gateway 22. This approach may also eliminate the signaling overhead needed for refreshing bandwidth reservations.

Communication system 10 offers a bandwidth management approach that allows a device or a component within a network environment to receive proper bandwidth allocations without having to communicate with packet gateway 22. This allows a terminal device, such as a mobile station being used by end user 12 for example, to benefit from RSVP operations without having to interact with packet gateway 22. The lack of communication necessary to trigger RSVP actions preserves network resources and further allows a terminal device to avoid maintaining a specific signaling protocol in order to re-establish appropriate communications with packet gateway 22.

Communication system 10 also takes advantage of the knowledge held by packet gateway 22 that provides information which is associated with dormancy state transitions of terminal devices or elements. This knowledge allows packet gateway 22 to autonomously re-establish designated operations with a terminal device or element without necessitating communication between the terminal device and packet gateway 22. This further simplifies management operations of bandwidth in a network environment. This may also allow a service provider to store one or more end user profiles on centralized server 28. The profiles offer one or more parameters to be used by a service provider in order to provide an appropriate quality of service (QoS) or a proper bandwidth allocation.

End user 12 is a client or a customer seeking to initiate or to establish a communication tunnel, link, or session in communication system 10 via IP network 16a. End user 12 may be inclusive of devices used to initiate a communication, such as a computer, a personal digital assistant (PDA), a laptop or a electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). Moreover, end user 12 as illustrated in FIG. 1 may generally reflect any device, component, or piece of network equipment that seeks some appropriate bandwidth allocation. End user 12 may also be any device that seeks to initiate a communication on behalf of another entity or element such as a program, a database, or any other component, device, element, or object capable of initiating a voice or a data exchange within communication system 10. Data, as used herein in this document, refers to any type of numeric, voice, or script data, or any type of source or object code, or any other suitable information in any appropriate format that may be communicated from one point to another.

RAN 14 is a communications interface or platform operating between end user 12 and packet gateway 22. RAN 14 may comprise a base transceiver station and a base station controller. The communications interface provided by RAN 14 allows data to be exchanged between end user 12 and any number of selected elements within communication system 10. RAN 14 facilitates the delivery of a request packet generated by end user 12 and the reception of information sought by end user 12. RAN 14 offers only one example of a communications interface between end user 12 and packet gateway 22. Other types of communications interfaces or platforms may be used for any particular network design or configuration in accordance with particular needs.

In operation, the base transceiver station within RAN 14 may provide transmit and receive interface links for communication system 10. One or more base transceiver stations may receive information from end user 12 in the form of data packets and communicate the data packets or information to corresponding base station controllers. The base station controllers may work in conjunction with the base transceiver stations in order to provide a link or interface between end user 12 and IP networks 16a or 16b. Base station controllers may then communicate data packets or information received from the base transceiver station to a network component within communication system 10.

The base transceiver station within RAN 14 may be a radio transmission and reception station for handling communications traffic. The base transceiver station may also be identified as a cell site, primarily so because it may hold one or more transmit/receive cells. One or more base transceiver stations within communication system 10 may include one or more receive/transmit antennas, a base station controller, a microwave dish, and suitable associated electronic circuitry.

IP networks 16a and 16b each represent a series of points or nodes of interconnected communication paths for receiving and transmitting packets of information that propagate through communication system 10. In a particular embodiment, IP networks 16a or 16b may represent a packet data network (PDN). IP networks 16a and 16b may also offer a communications interface between RAN 14 and one or more web servers 40 and/or AAA server 36. IP networks 16a and 16b may be any local area network (LAN), metropolitan area network (MAN), or wide area network (WAN) or any other appropriate architecture or system that facilitates communications in a network environment. IP networks 16a and 16b may implement a transmission control protocol/internet protocol (TCP/IP) communications language architecture in a particular embodiment of the present invention. However, IP networks 16a and 16b may alternatively implement any other suitable communication protocol for transmitting and receiving data packets within communication system 10.

WAP gateway 20 is a network point or node that operates as a data exchange interface between IP network 16a and IP network 16b. WAP, as referred to herein in this document, generally represents a specification for a set of communication protocols to standardize the way that wireless devices can be used for Internet access, including e-mail, the world wide web, newsgroups, and internet relay chat for example. The associated WAP communications layers are generally wireless application environment (WAE), wireless session protocol (WSP), wireless transport layer security (WTLS), and wireless transport protocol (WTP). WAP gateway 20 may cooperate with RSVP signaling element 24 within packet gateway 22 in order to accommodate the delivery of any suitable communications in a network environment, such as: voice over IP, call features (call waiting, call forwarding, three-way calling, caller I.D.), video phone, video streaming, video conferencing, internet access/browsing, intranet access, virtual private network systems, emailing, file transfer, M-commerce, location services (global positioning system (GPS) architectures, navigation, traffic conditions), and value added services (news, weather, sports, game, entertainment, music, etc.) for example. WAP gateway 20 may alternatively be any suitable communications platform, gateway, switch, router, or data exchange element capable of delivering, receiving, or processing information or data in a network environment.

Packet gateway 22 is a communications node or interface that provides a layer two or a layer three communications link or a point to point protocol (PPP) link between end user 12 and IP network 16a. Packet gateway 22 may also fill the role of a network access server (NAS), where appropriate, in providing layer two connectivity to a network. In a particular embodiment, packet gateway 22 is a packet data serving node (PDSN) that includes one or more PDSN communications elements providing access to the internet, intranets, WAP servers, virtual private network (VPNs), or any other elements operable to communicate with end user 12. The PDSN communications elements may provide an access gateway for both end user 12 and WAP gateway 20. The PDSN communications elements may also provide a communications node between IP network 16a and end user 12. Additionally, the PDSN communications elements may operate to authenticate, authorize, and provide an accounting functionality for information propagating through communication system 10. Packet gateway 22 may also store one or more profiles, where appropriate, associated with end user 12. The profiles may include information relating to user privileges, QoS parameters, access rights, or bandwidth allocation characteristics.

In another embodiment of the present invention, packet gateway 22 is a serving general packet radio service (GPRS) support node (SGSN) or a gateway GPRS support node (GGSN), providing a communications medium in a GPRS service network environment. Where communication system 10 is implemented in a GPRS environment, a series of IP network gateways may be provided and each may include a GGSN that works in conjunction with the SGSNs in communicating high-speed data exchanges within communication system 10. GPRS represents a packet-based data bearer service for communication services that may be delivered as a network overlay for any type of suitable network configuration or platform. GPRS generally applies packet-radio and packet switching principles to transfer data packets in an efficient way between global system for mobile communications (GSM) mobile stations and external packet data networks. GPRS may support multiple internet communication protocols and may enable existing IP, X.25, or any other suitable applications or protocols to operate over GSM connections.

RSVP signaling element 24 is a communications protocol operable to manage or control bandwidth and to trigger RSVP actions based on state transitions. The roll of RSVP signaling element 24 may be to provide resource admission control for any suitable communications, such as voice over IP for example. If resources are available, RSVP signaling element 24 may accept a reservation and install a traffic classifier, where appropriate, in the QoS forwarding path. The traffic classifier may indicate to (or otherwise direct) a QoS forwarding path how to classify packets from a particular flow and what forwarding treatment to provide.

The installation of a traffic classifier and flow treatment may be represented by the interface between RSVP signaling element 24 and another reciprocal communications protocol. RSVP signaling element 24 may facilitate the delivery of any suitable data or communications in a network environment such as voice over IP, call features (call waiting, call forwarding, three-way calling, caller I.D.), video phone, video streaming, video conferencing, internet access/browsing, intranet access, virtual private network systems, emailing, file transfer, M-commerce, location services (global positioning system (GPS) architectures, navigation, traffic conditions), and value added services (news, weather, sports, game, entertainment, music, etc.) for example.

Different applications may include different bandwidth characteristics by nature and thus service delivery requirements may also be different. For example, real time voice and video applications may require low latency while being able to tolerate medium to high packet loss. Other applications, such as file downloading for example, may require retransmission of lost packets, but may be capable of tolerating high transmission delay. Additionally, multiple applications may require transmission at the same time such as a wireless end user participating in a conference call (voice over IP) while checking email simultaneously. Such communication scenarios and arrangements may require appropriate QoS operations to differentiate service levels such that adequate resources are made available.

RSVP signaling element 24 may include any suitable hardware, software, component, device, or element that may release or request bandwidth for end user 12. Alternatively, RSVP signaling element 24 may be provided external to packet gateway 22, deleted entirely from communication system 10, or supplemented by suitable hardware or software within packet gateway 22 that effectuates some control over bandwidth allocations or decisions associated with end user 12. In a scenario in which RSVP signaling element 24 is deleted completely from packet gateway 22, packet gateway 22 may include appropriate hardware, software, components, devices, or elements that provide RSVP signaling operations for end user 12.

In operation, RSVP signaling element 24 may be implemented in packet gateway 22 in order to autonomously release or request bandwidth for end user 12. The actions executed by RSVP signaling element 24 may be based on knowledge possessed by packet gateway 22 relating to state transitioning of any selected piece of network equipment. RSVP signaling element 24 may secure bandwidth allocations on behalf of end user 12 without requiring its participation in RSVP signaling. The lack of signaling between end user 12 and packet gateway 22 reduces communications that would otherwise consume network resources and further obviates the need to ensure that a terminal device or element maintains a signaling protocol in order to communicate with RSVP signaling element 24 or packet gateway 22.

Centralized server 28 is a communications element having data storage capabilities for storing one or more end user profiles associated with clients or customers in the network. The end user profiles may contain any appropriate parameters or characteristics of end user 12 that may affect treatment of communications links, tunnels, or sessions. Each profile may include data reflecting bandwidth allocation parameters and/or information relating to QoS characteristics designated for end user 12. Centralized server 28 may also provide a point of management to a service provider (or any other entity) in order to control one or more operations associated with end user 12. Where appropriate, any of the information stored on centralized server 28 may be alternatively stored within packet gateway 22.

Centralized server 28 may glean information from data segments or hyper-text transfer protocol (HTTP) to identify a source associated with a packet propagating through communication system 10. The identification of the source may provide a correlation between end user 12 and a corresponding profile. For example, centralized server 28 may learn about end user 12 or a source through RADIUS packet inspection or by directly querying packet gateway 22. Centralized server 28 may also learn about end user 12 or a source through diameter communication protocols, terminal access controller access system (TACACS) protocols, or any other communications protocols used in any suitable network applications. TACACS represents an industry standard protocol specification, RFC 1492, that generally forwards username and password information to centralized server 28. Centralized server 28 may operate as a TACACS database or a database using a UNIX password file with TACACS protocol support. For example, the UNIX server with TACACS may pass requests to the UNIX database and send the accept or reject message back to an access server. Centralized server 28 may also perform any necessary decrypting protocols or other suitable transformations, where appropriate, as a request packet propagates through communication system 10.

Centralized server 28 may also include a table for properly storing one or more end user profiles to be used in routing information or data in communication system 10. The table included within centralized server 28 may be populated in a variety of ways. For example, when end user 12 connects to the network, a RADIUS request is made on its behalf by a NAS or any other appropriate device. In a mobile networking scenario, this request, potentially referred to as an Access-Request, may contain the user-ID in the User-Name attribute or in the calling station-ID attribute, which uniquely identifies which end user is requesting the information from the network. If AAA server 36 authenticates and authorizes end user 12 successfully, a RADIUS Access-Accept message may be communicated back to the RADIUS client (WAP gateway 20 or a NAS) with an IP address in the framed-IP address attribute. This IP address may be the address used by the WAP client or end user 12 when it sends IP packets to WAP gateway 20. Centralized server 28 may inspect the RADIUS packets exchanged and build a table that binds a user-ID with an assigned IP address. Entries within the table may be cleaned up, deleted, or updated periodically (or alternatively updated or changed based on some event or modification to system parameters) in order to accurately reflect one or more source profiles associated with one or more end users 12. Entries could also be deleted specifically or deleted per communications flow. In the case of RADIUS messaging, the population of the table may be controlled by RADIUS accounting messages or by any other suitable populating protocol according to particular needs.

AAA server 36 is a server program that handles end user 12 requests for access to networking resources. Networking resources refers to any device, component, or element that provides some functionality to end user 12 communicating in communication system 10. For a corresponding network, AAA server 36 also provides authentication, authorization, and accounting services and management. Authorization generally refers to the process of giving end user 12 permission to do or to access something. In multi-user computer systems, a system administrator may define for the system which end users are allowed access to given data in the system and, further, what privileges for end user 12 are provided. Once end user 12 has logged into a network, such as for example IP network 16*a*, the network may wish to identify what resources end user 12 is given during the communication session. Thus, authorization within communication system 10 may be seen as both a preliminary setting up of permissions by a system administrator and the actual checking or verification of the permission values that have been set up when end user 12 is attempting access. Authentication generally refers to the process of determining whether end user 12 is in fact who or what it is declared to be. In the case of private or public computer networks, authentication may be commonly done through the use of unique identification elements or log-on passwords. Knowledge of the password offers a presumption that end user 12 is authentic. Accounting generally refers to tracking usage for each end user 12 or each network and may additionally include trafficking information or data relating to other information flows within communication system 10 or within a particular sub-network.

AAA server 36 may receive the IP address and other parameters from any suitable source, such as an appropriate network gateway or alternatively from a dynamic host configuration protocol (DHCP) server or a domain name system (DNS) database element, in order to direct data to be communicated to end user 12. AAA server 36 may include any suitable hardware, software, components, or elements that operate to receive data associated with end user 12 and provide corresponding AAA related functions to network components within communication system 10. Authorization and IP address management may be retrieved by AAA server 36 from a layer two tunneling protocol network server (LNS), which may be provided to address secure services for end user 12 where appropriate. The assigned IP address may be a private or a routable IP address. On assignment of the IP address, the DHCP server may perform update procedures for updating the assigned IP address and leasing parameters for the end user of end user 12.

Web server 40 represents a program that, using the client/server model and the world wide web's HTTP, serves the files that form web pages to web users. Web server 40 may be provided as part of a larger package of internet and intranet-related programs for serving e-mail, downloading requests for file transfer protocol (FTP) files, building and publishing web pages, or any other suitable network operations according to particular needs.

In operation of an example embodiment, a message may be sent from RAN 14 (or an interface associated therewith) to packet gateway 22 that indicates end user 12 is dormant. A subsequent message may then indicate that end user 12 is now active. This state transitioning protocol is recognized by packet gateway 22. This is because when end user 12 first registered with packet gateway 22 or otherwise becomes active, end user 12 (when it wishes to initiate any activity such as voice over IP communications, viewing of a video stream, etc.) may negotiate terms that allow a second session to be linked with the first session. For example, as part of the initial session establishment, certain QoS parameters may also be registered. Either the terminal may signal a QoS parameter or profile to packet gateway 22 (if end user 12 is capable of doing so) and packet gateway 22 may then link a second session configuration with the previous session information. Alternatively, in cases where end user 12 cannot support such signaling (or has opted not to waste radio resources to do so), packet gateway 22 may execute this task on behalf of end user 12.

Accordingly, once the service for end user 12 has been established, along with its QoS, packet gateway 22 may store and recall that information such that when end user 12 goes into a dormant state, parameters associated therewith may be stored and recalled. Concurrently, resources associated with end user 12 may also be released where appropriate. When end user 12 becomes active, packet gateway 22 may acknowledge that it recognizes end user 12 and that end user 12 still maintains specific services that were bargained for or negotiated at a prior time or in a prior communication session. Packet gateway 22 may then reinstate the resources that originally were agreed upon or installed by packet gateway 22.

Packet gateway 22 may reinstate reservations that were established by end user 12 when it first became active (or executed on behalf of end user 12 at some prior time). In one general sense, packet gateway 22 may act as a proxy in executing this task for end user 12 and, in evaluating this task, avoids consuming valuable network resources on a corresponding radio link. Thus, packet gateway 22 may capitalize on its knowledge of state transitions and link that knowledge to reserving resources for end user 12 in a network environment.

FIG. 2 is a flowchart illustrating a series of example steps associated with a method for managing bandwidth in a network environment. The method begins at step 100 where end user 12 initiates a request for a piece of data or information (or establishes a communications tunnel or link) such that a communication session is established. At step 102, packet gateway 22 may receive this request and establish one or more QoS parameters for end user 12. At step 104, end user 12 may shift to a dormant state, which is acknowledged by packet gateway 22.

At step 106, end user 12 may become active again and seek to re-establish a communication session. The communication session may share the same parameters as originally negotiated in the previous establishment of the communication session. Packet gateway 22, at step 108, may then re-establish the communication session for end user 12. Dormancy state transitions may be used to release and request bandwidth for active to dormant and dormant to active transitions respectively.

Packet gateway 22 may use its knowledge of state transitions in order to trigger RSVP actions via RSVP signaling element 24. This may be accomplished without the need for end user 12 and packet gateway 22 to exchange RSVP signaling traffic across a corresponding air link. This operation may further eliminate the signaling overhead needed for refreshing bandwidth reservations. Some of the steps illustrated in FIG. 2 may be changed or deleted, where appropriate, and additional steps may also be added to the flowchart. These changes may be based on specific system architectures or particular communication arrangements or configurations and do not depart from the scope or the teachings of the present invention.

Communication system 10 may be used in a host of communications environments, such as for example in conjunction with a code division multiple access (CDMA) network. In a CDMA environment, all users of the CDMA system use the same carrier frequency and may transmit simultaneously. Each user has his own pseudo-random code word. Whenever end user 12 wishes to transmit, an associated system may correlate a message signal with the code word. The receiver performs decorrelation on the received signal. For detection of the message signal, the receiver identifies the code word used by the transmitter. Because many users of the CDMA system share the same frequency, CDMA systems could benefit from the teachings of the present invention in providing an accurate and efficient bandwidth management protocol for end user 12. IS-95 may also utilize the CDMA scheme in conjunction with the present invention.

Time division multiple access (TDMA) represents another protocol in which the disclosed configuration of communication system 10 may be implemented. In a TDMA access scheme, a set of end users 12 are multiplexed over the time domain, i.e. user U1 uses radio frequency F1 for time period T1 after which user U2 uses the same frequency F1 for time T1 and so on. The time axis may be divided into equal length time slots. In TDMA, each end user 12 occupies a cyclically repeating time slot defining a channel with N time slots making up a frame. In using TDMA, it is possible to allocate different numbers of time slots per frame to different users. Thus, bandwidth can be supplied on demand to different users depending on user needs. GSM and the IS-54/IS-136-based United States Digital Cellular (USDC) system are some of the standards that may use TDMA in conjunction with the present invention.

Frequency division multiple access (FDMA) represents another communications environment in which communication system 10 may be employed. The FDMA system assigns individual frequency channels or bands to individual users and allows all users to transmit at the same time. These channels are assigned on demand to users requesting service. During the call no other user can share the same frequency band. A FDMA channel carries only one communications exchange or session at a time. One or more end users 12, which may be used in conjunction with an FDMA system, may implement duplexers because both the transmitter and receiver operate at the same time. The Advanced Mobile Phone Service (AMPS) and the European Total Access Communication System (ETACS) are some of the standards that may use FDMA in conjunction with the bandwidth management approach of the present invention.

Although the present invention has been described in detail with reference to particular embodiments, it should be understood that various other changes, substitutions, and alterations may be made hereto without departing from the spirit and scope of the present invention. For example, although the present invention has been described as operating in PDSN or GGSN environments, the present invention may be used in any networking environment that seeks to manage bandwidth or resources associated with (or on behalf of) end user 12. The bandwidth management protocol disclosed in the preceding figures is generally applicable to any communication systems that manage or control bandwidth based on a state transition associated with end user 12.

Additionally, although the present invention has been described with reference to communications between end user 12 and IP networks 16*a* and 16*b*, the bandwidth management protocol described herein may be implemented for communications between any components within or external to a network. The present invention has merely described end user 12 and IP networks 16*a* and 16*b* for teaching and instructional purposes. This should not be construed to limit how or where the bandwidth management protocol of the present invention is implemented. Communication system 10 may be implemented in conjunction with any architecture or configuration that seeks to allocate bandwidth and include state transitioning in such a determination. Moreover, the processing and routing configurations disclosed above may be implemented in conjunction with any component, unit, hardware, software, object, or element involved in the communications process. Additionally, such bandwidth determinations may be effectuated for any device, component, or piece of network equipment.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for managing bandwidth in a network environment, comprising:
    a packet gateway operable to monitor a state transition of a communication session associated with an end user, the packet gateway operable to initiate one or more resource reservation protocol (RSVP) actions based on the state transition in order to control a bandwidth allocation associated with the end user, wherein the packet gateway includes an RSVP signaling element operable to initiate one or more of the RSVP actions based on the state transition without requiring a responsive communication from the end user.

2. The apparatus of claim 1, wherein the state transition is an active to dormant protocol that may be used to release the bandwidth allocation associated with the end user.

3. The apparatus of claim 1, wherein the state transition is a dormant to active protocol that may be used to request the bandwidth allocation associated with the end user.

4. The apparatus of claim 1, wherein the packet gateway includes one or more quality of service parameters stored in a profile that is associated with the end user.

5. The apparatus of claim 1, further comprising:
    a centralized server operable to store a profile associated with the end user, wherein the profile includes bandwidth reservation data that may be used to reserve the bandwidth allocation associated with the end user, and wherein the profile includes data associated with one or more quality of service parameters.

6. A method for managing bandwidth in a network environment, comprising:
    monitoring a state transition of a communication session associated with an end user;
    initiating one or more resource reservation protocol (RSVP) actions based on the state transition;
    controlling a bandwidth allocation associated with the end user based on one or more of the RSVP actions; and
    implementing an RSVP signaling protocol operable to initiate one or more of the RSVP actions based on the state transition without requiring a responsive communication from the end user.

7. The method of claim 6, wherein the state transition is an active to dormant protocol that may be used to release the bandwidth allocation associated with the end user.

8. The method of claim 6, wherein the state transition is a dormant to active protocol that may be used to request the bandwidth allocation associated with the end user.

9. The method of claim 6, further comprising:
    storing one or more quality of service parameters in a profile that is associated with the end user.

10. The method of claim 4, further comprising:
    storing a profile associated with the end user at a centralized server, wherein the profile includes bandwidth reservation data operable to be used to reserve the bandwidth allocation associated with the end user, and wherein the profile includes data associated with one or more quality of service parameters.

11. A system for managing bandwidth in a network environment, comprising:
    a packet gateway operable to monitor a state transition of a communication session associated with an end user, the packet gateway operable to initiate one or more resource reservation protocol (RSVP) actions based on the state transition in order to control a bandwidth allocation associated with the end user, wherein the packet gateway includes an RSVP signaling element operable to initiate one or more of the RSVP actions based on the state transition without requiring a responsive communication from the end user, and wherein the packet gateway includes one or more quality of service parameters stored in a profile that is associated with the end user, the state transition reflecting a selected one of an active to dormant and a dormant to active protocol that may be used to respectively release and request the bandwidth allocation associated with the end user.

12. A system for managing bandwidth in a network environment, comprising:
    means for monitoring a state transition of a communication session associated with an end user;
    means for initiating one or more resource reservation protocol (RSVP) actions based on the state transition;
    means for controlling a bandwidth allocation associated with the end user based on one or more of the RSVP actions; and
    means for initiating one or more of the RSVP actions based on the state transition without requiring a responsive communication from the end user.

13. The system of claim 12, wherein the state transition is an active to dormant protocol that may be used to release the bandwidth allocation associated with the end user.

14. The system of claim 12, wherein the state transition is a dormant to active protocol that may be used to request the bandwidth allocation associated with the end user.

15. A computer readable medium having code for managing bandwidth, a computer executing the code operable to:
    monitor a state transition of a communication session associated with an end user;
    initiate one or more resource reservation protocol (RSVP) actions based on the state transition;
    control a bandwidth allocation associated with the end user based on one or more of the RSVP actions; and
    initiate one or more of the RSVP actions based on the state transition without requiring a responsive communication from the end user.

16. The medium of claim 15, wherein the state transition is an active to dormant protocol that may be used to release the bandwidth allocation associated with the end user.

17. The medium of claim 15, wherein the state transition is a dormant to active protocol that may be used to request the bandwidth allocation associated with the end user.

18. The medium of claim 15, further operable to:
    store one or more quality of service parameters in a profile that is associated with the end user.

* * * * *